United States Patent [19]

Dallimonti

[11] 4,001,807
[45] Jan. 4, 1977

[54] CONCURRENT OVERVIEW AND DETAIL DISPLAY SYSTEM HAVING PROCESS CONTROL CAPABILITIES

[75] Inventor: Renzo Dallimonti, Ambler, Pa.

[73] Assignee: Honeywell Inc., Minneapolis, Minn.

[22] Filed: Feb. 3, 1975

[21] Appl. No.: 546,321

Related U.S. Application Data

[63] Continuation of Ser. No. 388,949, Aug. 16, 1973, abandoned.

[52] U.S. Cl. .................. 340/324 A; 178/DIG. 38; 340/225
[51] Int. Cl.² .................................. G06F 3/14
[58] Field of Search ........ 340/225, 324 A, 324 AD; 178/DIG. 38

[56] References Cited
UNITED STATES PATENTS

| | | | |
|---|---|---|---|
| 3,474,438 | 10/1969 | Lauher | 340/324 A |
| 3,641,266 | 2/1972 | Stults et al. | 178/DIG. 38 |
| 3,670,322 | 6/1972 | Mallebrein | 340/324 AD |

*Primary Examiner*—Marshall M. Curtis
*Attorney, Agent, or Firm*—Laurence J. Marhoefer; Lockwood D. Burton; Mitchell J. Halista

[57] ABSTRACT

A cathode-ray tube, i.e., CRT, console having a plurality of CRT display faces with a data display on each CRT being divided among predetermined spatially oriented locations with correlated manually operable switches adjacent to each location area on the periphery of an associated CRT. The switches are used to control the display of additional and detailed information concerning an associated data area either on a CRT adjacent to the switches or on another adjacent CRT. Additional switches are provided on the console to enable an operator to respond to a data display by manipulating these additional switches to effect an adjustment or control of the data being displayed.

10 Claims, 8 Drawing Figures

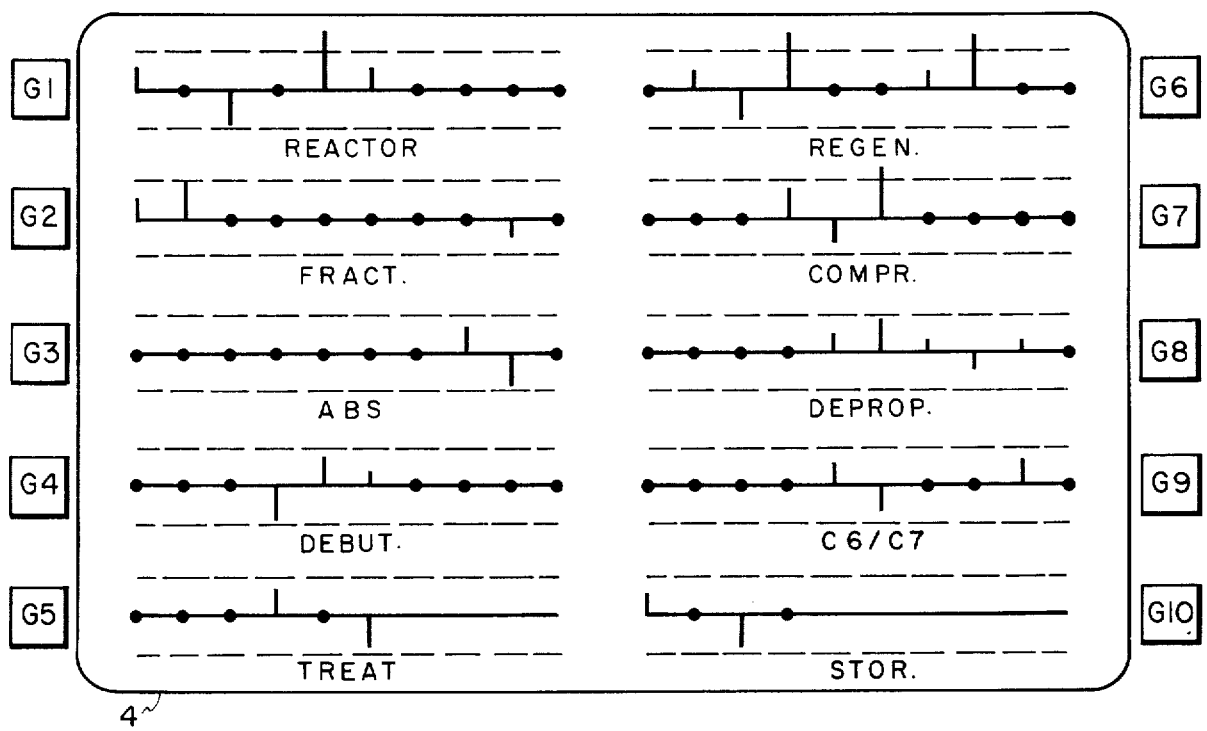
FIG. 4 OVERVIEW DISPLAY
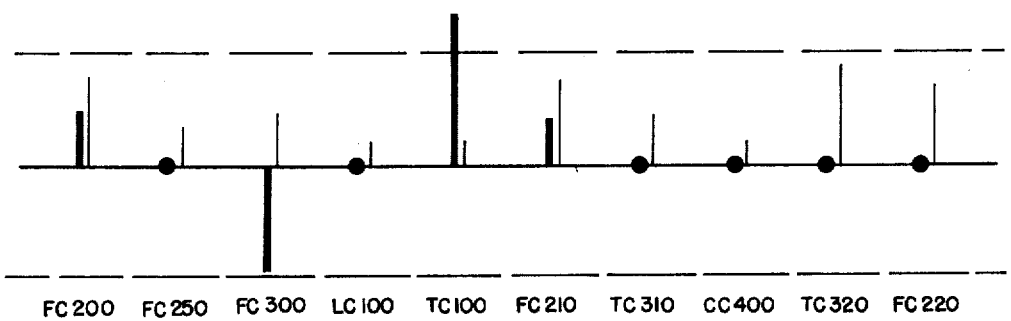
FIG. 5 GROUP DISPLAY

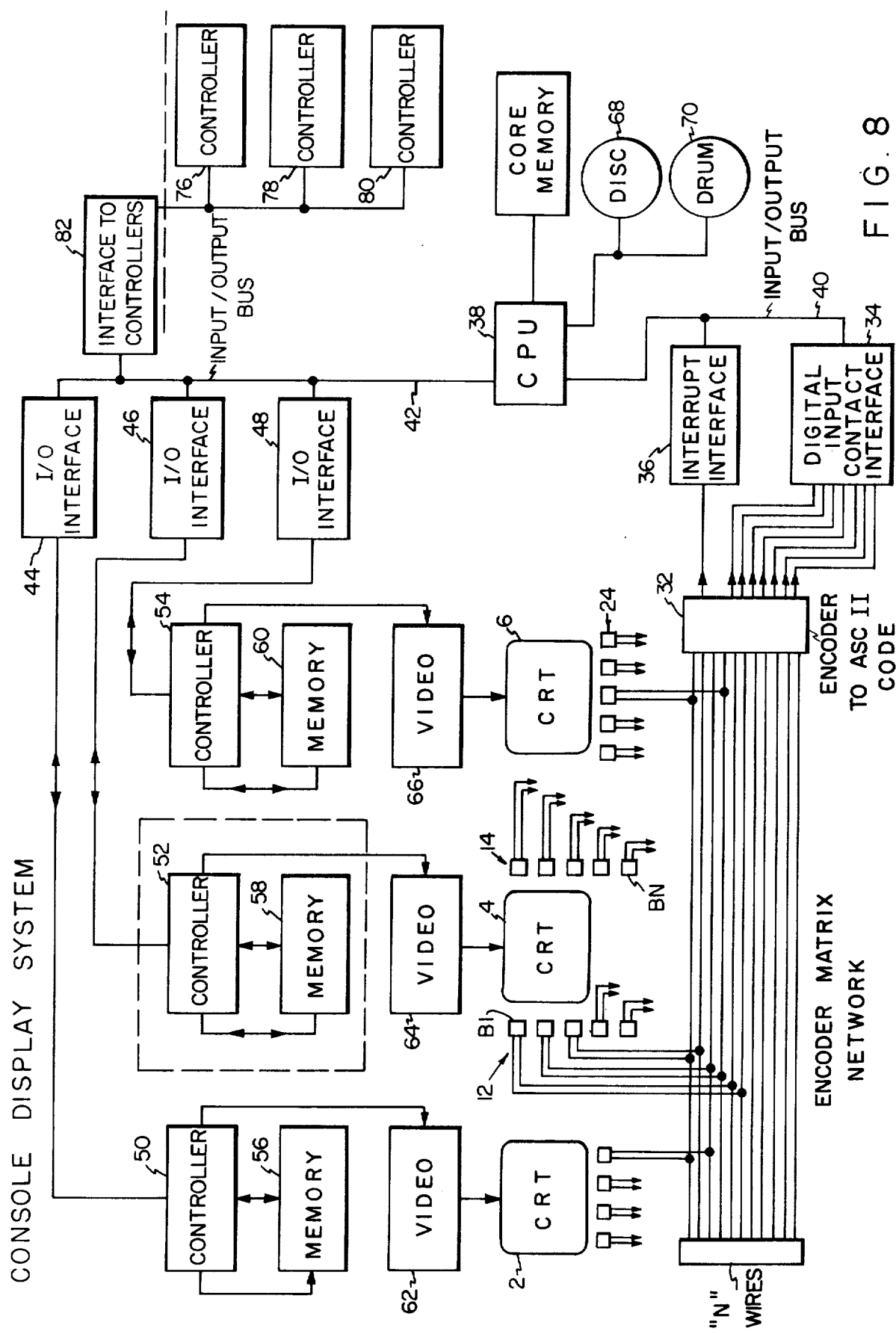

CONCURRENT OVERVIEW AND DETAIL DISPLAY SYSTEM HAVING PROCESS CONTROL CAPABILITIES

This is a continuation of application Ser. No. 388,949 filed on Aug. 16, 1973, now abandoned.

BACKGROUND OF THE INVENTION

1. Field of the Invention

The present invention relates to a cathode-ray tube digital display and control system such as may be found, for example, in Class 340, sub-Class 324 of the classification system of the United States Patent Office. More specifically, the present invention is directed to a cathode-ray tube digital system using a plurality of cathode-ray tubes having display faces spatially associated with each other and respective displays produced in a digital computer oriented system.

2. Description of the Prior Art

In the automatic control of an industrial process, e.g., such as those found in processes involving chemicals, Petroleum, metals, paper, food, municipal water and sewage systems, it is common practice to provide a large display panel on which are mounted a great number of individual process control instruments and related readout devices all of which are arranged for manipulation and monitoring by a human operator in order to achieve control over the process. As industrial plants have become larger and control systems have been highly integrated and concentrated into central control rooms, the amount of information necessary to be displayed for adequate control over the process has increased tremendously. This has also increased the amount of data concerning the process which the human operator is required to quickly assimilate and the effect the appropriate and necessary control measures.

With the advent of digital computer control of industrial processes and new economical methods of compact display such as the cathode-ray tube, it has become technically and economically feasible to make a radical departure from the traditional large panel of instruments and display devices to a console or desk top design of a display and control center. The result is a better human engineered display and control interface that is more compatible with the human factors that inherently constrain the operator's physical actions and mental processes. The use of such an interface provides a more compact and useful arrangement of process data and correlated control functions which arrangement can not readily be achieved through the conventional and current practice of placing numerous instruments either side by side or in various arrangements on a large central control panel. Current known achievements in the area of such a central display and control configuration may be found in the December, 1965 issue of "Control Engineering" on pages 77 to 83; the January, 1971 issue of "Instrumentation Technology" on pages 58 to 62; the March, 1972 issue of "Canadian Controls and Instrumentation" on pages 22 to 25; in the Dec. 14, 1972 issue of "Machine Design" on pages 124 to 129. In attempting to effect such a consolidation of information display for the purpose of providing the most effective process/operator interface, such prior art display and control systems have, however, failed to provide the most efficient and compact display system. In some cases, more information than the operator can grasp has been provided, and, in other cases, necessary and desirable information has been omitted.

In accordance with the present invention, it has been determined that the following display and control functions must be provided for the operator for effecting an efficient and compact display:

1. A broad overview of a total operating process is needed to enable the monitoring by the operator of hundreds of data points in an extremely short period of time to determine whether or not the process is operating properly.
2. In such an overview the operator is directed to areas of the process which may require further and detailed examination. This further examination necessitates a second display of information identified as a detail view of the system for providing the operator with specific detailed information about a small portion of the total operating process. This detailed information ideally should be presented concurrently in combination with the overview picture as in independent and parallel display.
3. An alarm alert, display or annunciator, is needed to direct the attention of the operator to process conditions which have deviated beyond the range considered to be representative of satisfactory operation and which might involve situations caused by catastrophic failures within the process. This alarm display also should be a parallel and independent display correlated to the aforesaid overview and detailed display.

SUMMARY OF THE INVENTION

Accordingly, it is an object of the present invention to provide an improved display and control system and control system which is operative as an operator/process interface to provide a display of the process operating conditions and means to adjust those conditions.

Another object of the present invention is to provide an improved display system having a detail display of portions of a process operating conditions in combination with a concurrent overview display of the overall process conditions.

A future object of the present invention is to provide an improved display system having an alarm condition display concurrently with overview and detailed displays of process operating conditions.

A still further object of the present invention is to provide an improved cathode-ray tube display having areas on a cathode-ray tube display face correlated with manually operable switches located adjacent thereto for providing an operator interface with the display areas on the cathode-ray tube display face.

In accomplishing these and other objects, there has been provided, in accordance with the present invention, a process condition display and control system using a plurality of display devices each having a display face and manually operable switches associated with each of the display faces for allowing selection by an operator of portions of a display on a display face for detailed presentation on the same or an adjacent display device. with the detailed presentation being correlated with either the same or additional manually operable switches to allow subsequent selection for display presentation. Additional manually operable switches are provided to permit selective control of process operating conditions displayed on the display devices.

BRIEF DESCRIPTION OF THE DRAWINGS

A better understanding of the present invention may be had when the following detailed description is read in connection with the accompanying drawings, which:

FIG. 4 is a pictorial illustration of an overview display of one of the CRT display units employed in the console of FIG. 1;

FIG. 5 is a pictorial illustration of a detailed display provided by another one of the CRT display units employed in the console of FIG. 1;

FIG. 8 is a block diagram illustrating a system for operating the console of FIG. 1.

DESCRIPTION OF THE PREFERRED EMBODIMENT

DETAILED DESCRIPTION

Figure 1:
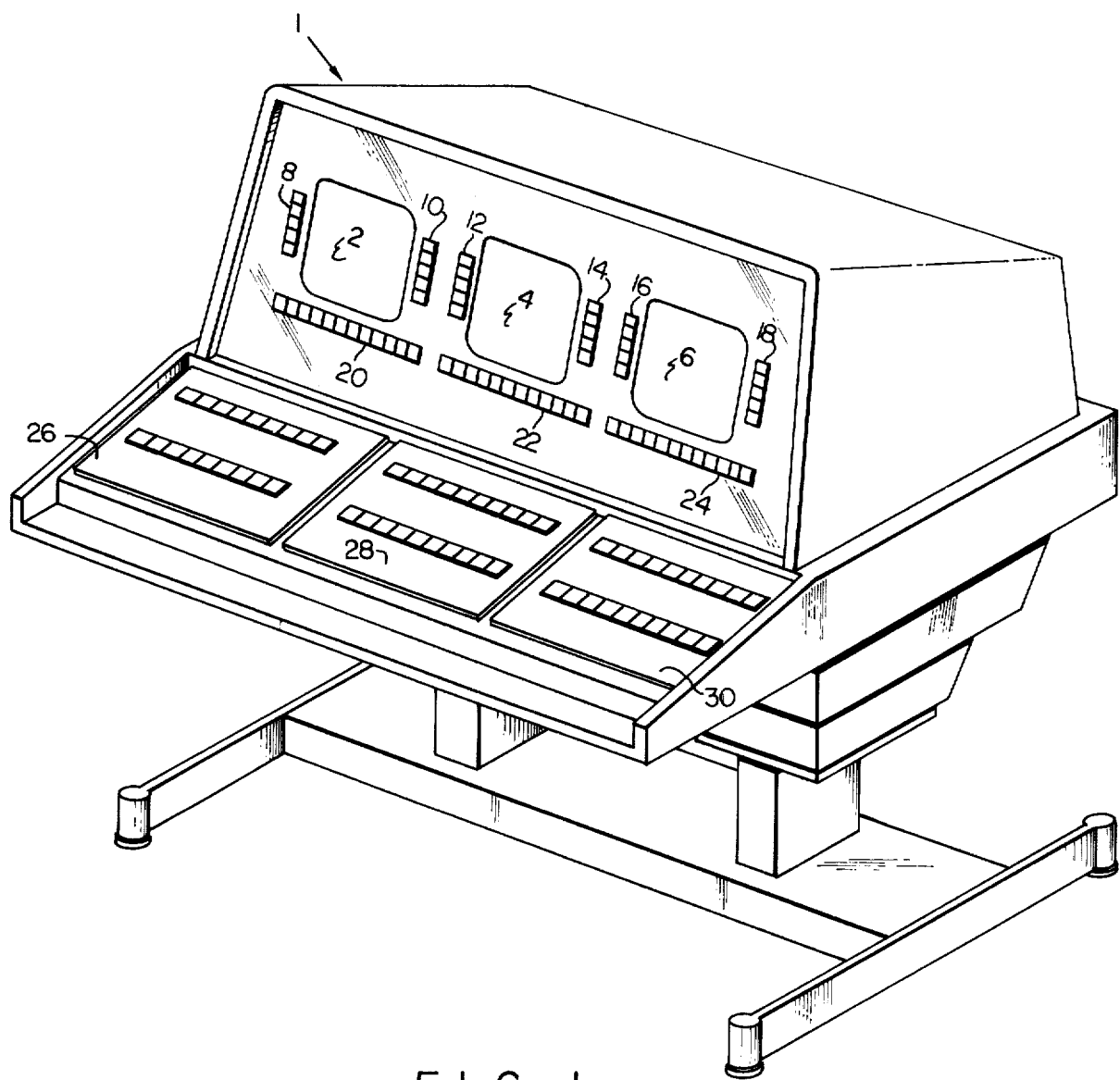
FIG. 1 is a pictorial illustration of a display console embodying the present invention.

Referring to FIG. 1 in more detail, there is shown an operator's console embodying the present invention for monitoring and controlling industrial processes. Basically, the console consists of three cathode-ray tubes, or CRT's, indicated as CRT's 2, 4 and 6 and several sets of manually actuable switches with each set being associated with each of the CRT's. These switches and the switches hereafter described as embodied in the console may be of the toggle, pushbutton, capacitance, Hall effect, etc. type. Further, it is contemplated that the switches may be embodied in an overlay covering the face of the CRT with the overlay being of a transparent construction to allow the operator to view the display on the face of the CRT while enabling a switching operation to be performed by the operator in conjunction with a display. Specifically, sets of switches 8 and 10 are arranged in vertical arrays on the opposite sides of CRT 2. Similar vertical arrays of switches 12, 14, and 16, 18 are arranged on the opposite sides of the CRT's 4 and 6, respectively. A horizontal array of switches is provided, individual to and under each of the CRT's. These horizontal arrays of switches are deisgnated 20, 22, and 24. The several vertical and horizontal switch arrays are operable in a manner described in more detail hereinafter to provide access to and display for the operator of the many process variables or operating conditions. Also provided on the console 1 in association with the CRT's 2, 4 and 6 are control keyboards indicated at 26, 28 and 30. In the illustrated embodiment of FIG. 1, each keyboard is provided with two vertically displayed horizontal arrays of switches. The keyboards 26, 28 and 30 are provided to enable the operator, following visual access to the process operating conditions via the CRT's 2, 4, and 6, to effect desirable and necessary corrective control adjustments to different operating parameters of the process, as further described hereinafter.

As apparent by reference to FIG. 1 the console differs from those known in the prior art in two major and important respects. First, the displayed information relating to the process operating conditions is organized into categories and display formats having specific and predetermined relationships with one another. Second, the display information is accessed by the operator through the operation of switch arrays which are closely physically associated with the information displayed, as further explained hereinafter. The provision of the switch arrays in such physical association with the CRT's simplifies and improves the accuracy of the work of the operator in accessing the desired process information and data. As a consequence, there is no need, as with the known prior art arrangements, for the operator either to remember complicated indentification codes or to operate extraneous devices, such as a light pen, in gaining access to the data. The three CRT's 2, 4 and 6 in the console 1 are arranged to provide three interrelated information functions. Specifically, the center CRT 4 provides an overview of the process operating conditions. The overview of the total process operating conditions provided by center CRT 4 on the console as illustrated and described in a concentrated and simplified presentation of simultaneous measurements of many process conditions made on a dynamic process. These measurements are herein referred to as a data base and may typically be measurements of temperatures, pressures, flow, chemical analysis, etc., of the wide variety of process conditions of variables that are encountered in many industrial processes. The CRT 6 on the right side of the illustrated console 1 provides a display of detailed information which may be required by the operator as a result of observations made in the overview display shown on the center CRT 4. The CRT 2 on the left side of the console 1 is reserved for the display of alarm condition data relating to the monitored industrial process.

MODE OF OPERATION

Each of the many process conditions of variables affecting an industrial process must be maintained within a predetermined range of values. The ranges are those that have been determined to correspond to proper operation of the process being monitored. The principal goal of the operator is to determine that a process is, in fact, operating within the ranges at the desired levels and to take corrective action when necessary. The typical size of the data base, i.e., the collection of measurement information about the process being monitored and controlled, can incorporate data from as many as several thousand measured points in theprocess. Thus, the overall problem is to organize the data base in such a manner that the operator has displayed only the pertinent data required for a "quick look" at the process parameters during normal process operating conditions while a "detailed look" display is available when any of the process parameters are abnormal. Concurrently, an alarm display is automatically provided to alert the operator to abnormal operating condition independently of the operator's analysis of the "quick look" display. In other words, while it is impossible for an operator to absorb several thousand items of information simultaneously, it is essential for the operator to have quickly available information on what the total process is doing with respect to each of the measured variables.

An industrial process or plant can be viewed as an aggregation of plant equipment that can be subdivided into process units. A process unit is a subdivision which can be treated as an entity to be monitored and controlled by an operator. A centralized control room may have the interfaces for several of such process units located in one location. The display and control console 1 shown in FIG. 1 is such an interface and is suitable for operating one or more of such process units. The further discussion of a console shown in FIG. 1, however, is based on a design for the display and control of process variables associated with a single process unit. This is done solely for the purpose of simplifying the following discussion. For purposes of illustration, the process unit to be described is one known in the chemical industry as a "cat cracker". The "cat cracker" and its associated distillation columns may be viewed as components of a process unit. There are within such a process unit elements which are related and may be considered together because they represent an interconnected assemblage of equipment, for example, the reactor, main fractionater, regenerator, etc., in the above mentioned example. Measurements of process conditions or variables within each of such elements are of a particular interest to the operator in the monitoring and control of a total process.

In the preferred embodiment of the invention herein described, the data base is therefore broken down into groups of measurements which are eacg related to a corresponding element in a physical assemblage of equipment in the industrial process being monitored and controlled, Selectively, each group data can be further subdivided into details of individual process conditions within the respective group element. It is contemplated that data relating to each group may be divided into two broad categories, i.e., data representing measured variables which are subject to being displayed and which are under automatic control and data representing measured variables which are not under automatic control but are merely subject to display. An important common factor in respect of all such categories is that there are levels of information or data which must be organized or displayed in order to provide the operator with the process information in sufficiently detailed form end content consistent with simplicity to enable the operator quickly to analyze the process operating parameters and to effect the required process correction adjustments.

Figure 2:
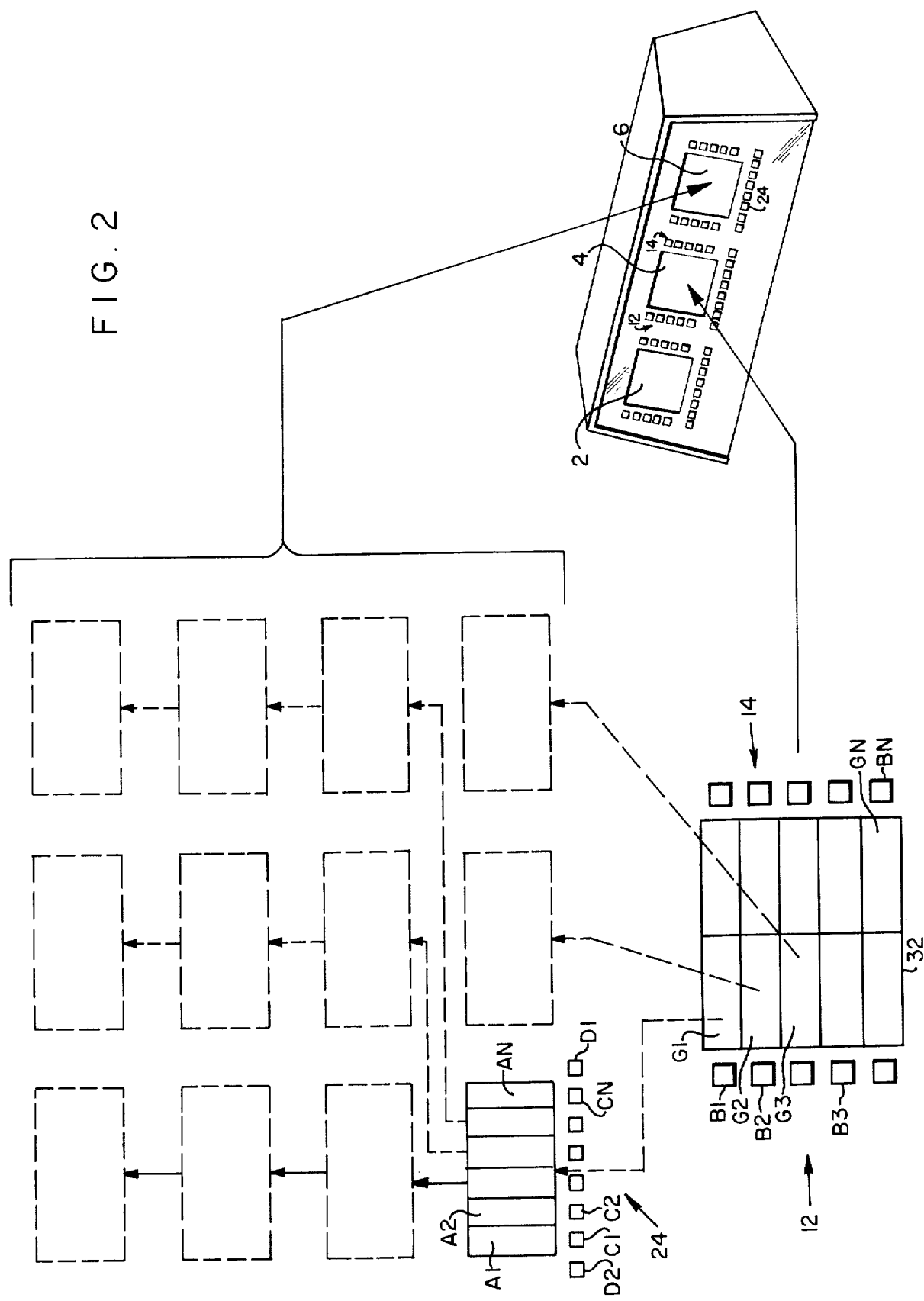
FIG. 2 is a block diagram which is provided to explain the operation of the display console illustrated in FIG. 1.

In FIG. 2, there is shown a block diagram of the operation of a display system embodying the present invention. Considering the display face of the CRT 4, for example, as an area, which has indicated by the numeral 32, is shown divided into smaller areas called group areas indicated by reference numbers G1, G2, G3 . . . Gn. In each of these group areas, the CRT 4 is arranged to display group information. This is overview type information which consolidates process unit information on many process variables into a simplified and compact display. Based on this overview the operator may determine whether or not more detail is necessary or desirable on the supporting information for a particular group. Such specific information about a particular group is accessed by the selective operation of the switch arrays 12 and 14. Specifically, each of the display data groups has one of the switches of the aforementioned arrays positioned immediately adjacent thereto. Actuation of each switch brings into view on the CRT 6, which is adjacent to the CRT 4, the next level of detail relating to that group. In FIG. 2, the switches 12 and 14 are further identified with reference characters B1, B2, B3 . . . BN. Thus, in order to access more specific information about a particular group displayed on the face of the overview CRT 4, the corresponding switch adjacent to that group area is actuated by the operator. Accordingly, if the operator sees by reference to CRT 4 in the overview display that the data being displayed in a particular group area indicates that the element of equipment from which that group is derived is not functioning properly, more detailed information about that element is readily and quickly available by simply actuating the adjacent group switch. This actuation of the group switch is effective to cause the group detailed picture to be displayed on the face of the adjacent CRT, e.g. CRT 6. It should be noted that the overview picture continues to be displayed by the CRT 4 to provide the operator with the continuing process overview information while the detail information for a particular group is concurrently available on the adjacent CRT 6. Thus, the operator may view in detail the process operating conditions in a portion of the total process while still having access to the operation of the entire process unit through the use of the overview display.

Because of physical limitations on the amount of information it can be shown on the face of the single CRT at any one time and because of the large amount of information, it may be required in some cases, information or data relating to each group must be capable of being further subdivided. Thus, the initial group detail picture shown on CRT 6 is displayed in display area A1, A2, . . . AN of the CRT display face 6 with each display area being adjacent to a manually actuable switch C1, C2, . . . Cn located adjacent to the periphery of the CRT 6. The latter switches are shown as part of the horizontal array of push buttons 24. These latter switches provide the operator with a means for selecting sub-elements of data group for further detail study.

Additional switches D1 and D2 which are part of the switch array 24 are provided adjacent to the group detail display CRT 6 for operation by the operator to sequentially advance the display of the detailed data relating to a selected group. Such progressive detail displays are referred to hereinafter as "paging" i.e., as the selection of successive pages of display. For example, a push button D1 may be arranged to effect the display of further detail information, i.e., to advance the display to the next page. This may be over the entire face of the CRT with the preceeding display being removed therefrom. Conversely, switch D2 may be arranged to effect a return to the immediately preceeding page of the information. Thus, the operation of the first push button switch D1 may be regarded as the selection of a succeeding page in the "paging" operation while the operation of the second push ubtton switch D2 may be regarded as a selection of a preceeding page in the "paging" operation. According to the present invention, it is contemplated that such "paging" information is obtained from a suitable memory embodied in the console as described hereinafter in connection with FIG. 8. If it is desired to obtain further information such as trend information, etc. about one of the sub-group details A1, A2, . . . An, this information could be available as a page of information to be accessed by the switches D1 and D2 after the sub-element has been selected by the use of the switches C1, C2, . . . CN. Accordingly, the operator has available a complete range of data about any of the groups.

The alarm CRT 2, on the other hand, is used to display alarm values of the process variables and other information which should be automatically brought to the attention of the operator without any delay in order to alert the operator to a malfunction in the operation of the process being monitored and controlled.

Thus, the arrangement illustrated in FIG. 2 permits the operator to access process data from a vast store of information in a straight-forward manner with a relatively small number of switches and without the use of any codes that the operator must remember. The operator, moreover, is specifically aided in the selection of the desired data by the current display under observation which indicates the switch to be operated to provide the additional detailed information needed by the operator.

Up to this point, the console has been described as a data acquisition and display interface. In the monitoring and control of the process, however, the operator will also want to perform certain manipulations on the variables being monitored such as a change in set point, change from automatic to manual control and vice-versa, etc. Therefore, means have been provided on the console for effecting such operations. In the console, as shown in FIG. 1, the keyboards 26, 28, and 30 are arranged to enable the operator to perform the necessary process unit corrective actions. For example, as a result of a particular group being selected for display on the CRT 6, the associated keyboard 30 is automatically connected to control the sub-elements in that group whereby the manipulative functions possible through the keyboard 30 can be directed to the selected process group. For example, upon the selection of a group, the final process control elements, e.g., valves, of the associated process unit can be adjusted by the operator by manipulation of the related keyboard 30. The controller setpoints similarly may be adjusted, as can the controller alarm limits and other process controls.

The keyboards 26, 28, and 30 are associated with the CRT's in physical arrays that are adapted to the anticipated needs of the process being monitored and controlled. Thus, the key-board 30 associated with the detail CRT 6, is arranged to provide set-point change, manual control, trend display, and mode switching, i.e., manual to automatic control and vice-versa. This set of functions are among those most frequently peformed by the operator in industrial process applications and are, therefore, segregated in the keyboard associated with the detail CRT 6. It is further contemplated that another array of switches may be added above or below the face of the CRT 6. Such an array with legends displayed on the CRT display face to identify the function performed by actuation of the physically associated push buttons may be employed in lieu of the separate keyboard 30, as shown in FIG. 1.

In the operation of the keyboard 30, a first switch may be used to select a process control variable and second and third push button switches may be employed to raise and lower respectively the set-point of the process variable. A fourth switch may be actuated to provide manual control of the process variable. The control of the process variable may then be operated by actuation of the second and third switches. These switches are operative only on that particular control group that has been selected for display on CRT 6 by the actuation of the vertical and horizontal arrays of switches 12, 14, and 24.

In an operating industrial process that is being monitored, it is contemplated that the console 1 is arranged to normally provode a display of the overview information in the center CRT 4. That is, the console 1 is arranged to automatically display the overview picture. Following the observation of the overview display, the operator may initiate a sequence of detail information acquisition or process variable control, as previously described.

Figure 3:
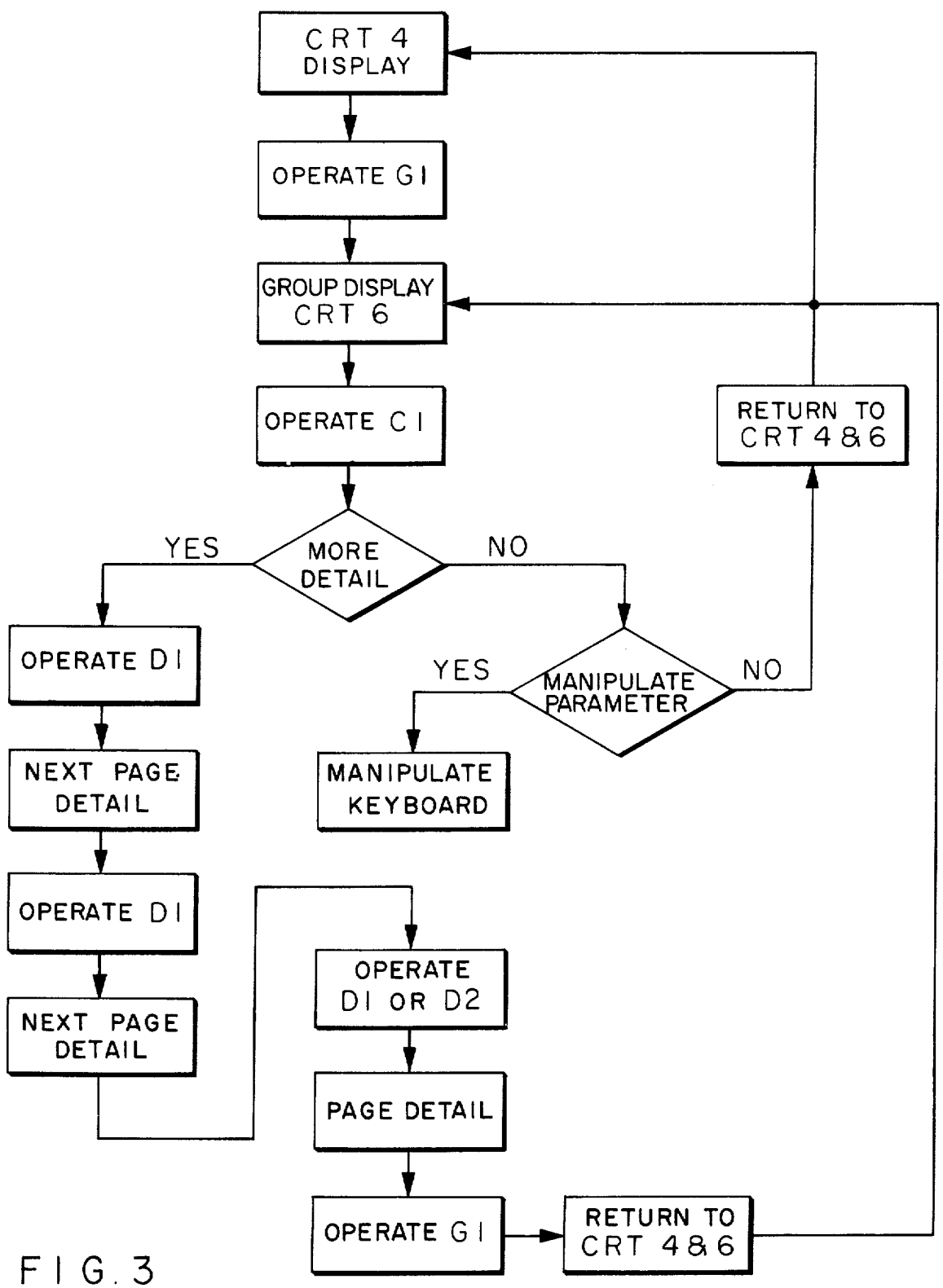
FIG. 3 is a flow chart of the operation of the console shown in FIG. 1 using the technique illustrated in FIG. 2.

In FIG. 3, there is shown an operator flow chart listing the steps in the operation of the console shown in FIGS. 1 and 2, as described above. The references within the blocks shown in the flow chart of the FIG. 3 are related to the physical elements shown in FIGS. 1 and 2. The flow chart, therefore, summarizes the operation of the console as described above.

In FIG. 4, there is shown a typical presentation for the ovewview display for the center CRT 4. The variable process parameters shown on the overview display are related to their nominal, or set-point, operating values by the solid horizontal lines shown for each group of variables, and deviations therefrom are indicated by the vertical lines extending away from the horizontal lines toward broken horizontal lines spaced above and below the solid horizontal lines. The broken lines indicate the alarm limits above and below the set-point value for each process parameter, and, thus also indicate the range of values over which each of the process parameters may normally vary.

The illustrated display for the first group G1 shows that one of the variables, e.g., temperature has exceeded its limit value. This overview display alerts the operator to request group detail for this group of data to check on the operation of the process. element for which an excessive temperature is indicated. If this temperature were a critical variable, with respect to the process being monitored, it would also be shown on the alarm CRT 2 on the left hand side of the console illustrated in FIGS. 1 and 2. This alarm display function is not controlled by the operator although information contained therein will be affected by the control operations taken by the operator to return the process being monitored to a normal operating state.

Figure 6:
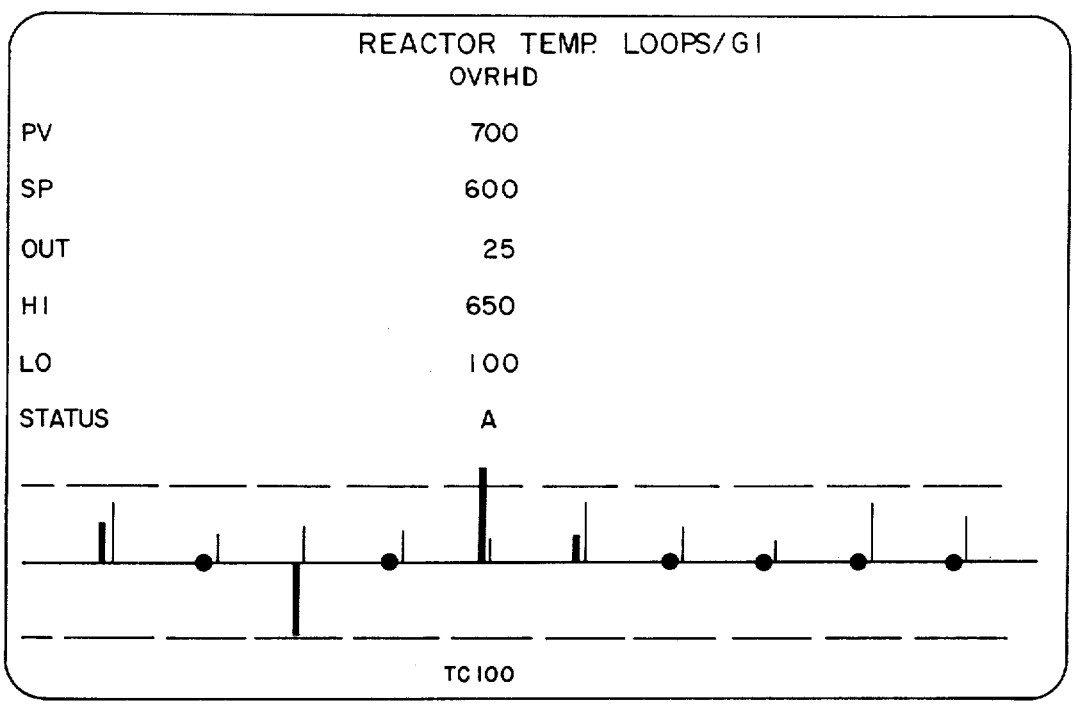
FIG. 6 is a pictorial illustration of a furthe display provided by a CRT unit employed in the console of FIG. 1.
Figure 7:
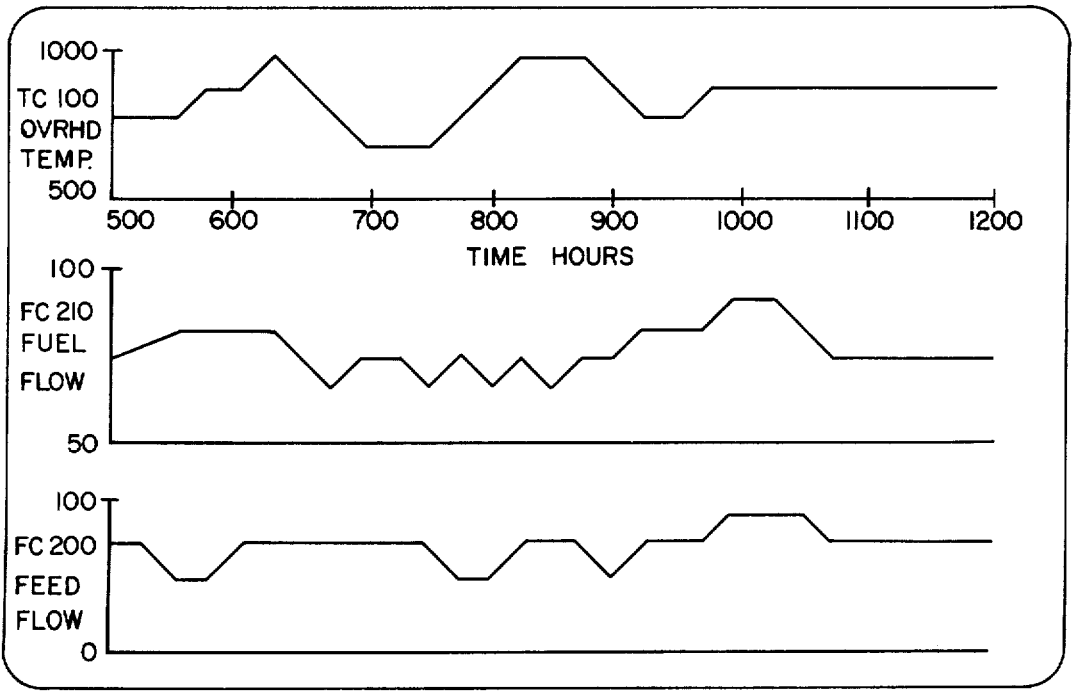
FIG. 7 is a pictorial illustration of a different format of a display by a CRT unit employed in the console of FIG. 1.

By operating the associated group switch G1, adjacent to the CRT 4 the operator is provided with a group detail display on the detail CRT 6. This detail display as shown in typical form in the illustration of FIG. 5. By operating the associated switch under the detail CRT 6, that is, switch 5 which corresponds to the variable as seen in FIG. 4, that has exceeded its upper limit, the detail display on CRT 6 is limited to that particular variable. The display obtained on CRT 6 after such an actuation of switch 5 is illustrated in FIG. 6. Subsequently, by operating switch D1, adjacent to CRT 6 as seen in FIG. 2, which switch may be designated as a next page switch, the operator may select the next page of display information available to the display console. For example, the next display could be a trend display which shows a long term accumulation of data presentation with respect to the particular variable selected by the operator in the prior display on the detail CRT 6. A typical trend display is illustrated in FIG. 7. The operator can cycle between the various available displays by alternate operation of the paging switches D1 and D2 which are identified in FIGS. 5 to 7 as next page and previous page switches respectively. In FIG. 8 there is shown a block diagram of the several components and their interconnection that form the operating system for the console 1 shown in FIGS. 1 and 2. The block diagram in FIG. 8 is composed of typical digital circuit blocks commonly used for digital display and control systems. The relationship of the switch arrays to the display shown on the CRT's is shown pictorially and in a simplified manner since this relationship been previously described.

The following discussion is directed to the operation of the difital system shown in FIG. 8 to produce the display on the CRT's 2, 4 and 6. Using the switch identified as B1, as an example, this switch is effective to energize a two-wire circuit which is connected to an encoder matrix network 31, as shown, whereby a digital code is produced by the matrix 31, for example, from a "2 out of 10" code. In other words, two digits or two bits out of a ten bit matrix are energized by each switch associated with the CRT's 2, 4 and 6 and the switches in the keyboards 26, 28 and 30. By this method a large number of switches can each have a unique digital code associated with each of them. This code is applied to an encoder block 32 which is an encoder to ASCII code. This is well-known circuit that converts the "2 out of 10" code into the ASCII code. The ASCII code is a standard ASCII code which consist of a six bit code plus a possible seventh bit for parity checking.

The output from the encoder 32 is applied to the digital input contract interface unit 34 with a special interrupt signal going to an interrupt interface circuit 36. The interrupt signal going to the interrupt interface 36 is a signal which alerts a digital computer, or CPU 38, to the fact that a switch has been actuated and requires attention, or servicing, by the CPU 38. To this end, a special interrupt routine is stored in the CPU 38 as a part of a program or software, of the computer. When the interrupt is transmitted by the input/output bus 40 to the CPU 39, the latter jumps, or transfers, to the special interrupt program which then directs the CPU 30 to read the ASCII code coming in via the digital input interface 34, through the input/output bus 40. The ASCII code corresponds to a predefined action which the software will carry out once it is informed that the ASCII code has been initiated. For example, a particular ASCII code might correspond to a call for one of the group detail pictures on CRT 6 as has been previously described, i.e., it might be interpreted by the software as a request for a group summary to be sent to the CRT 6 as shown in FIG. 5.

When the program for display generation and transmission is initiated, the ASCII code is sent out over the input/output bus 42 to input/output interface cards 44, 46, and 47. These cards provide circuits to convert a parallel set of digital bits into a serial string of digital bits for transmission over a communication line to respective controllers 50, 52, and 54 for the CRT's 2, 4, and 6, respectively. The controllers 50, 52 and 54 are in themselves a form of simple computer, or minicomputer, which can take the ASCII code and interpret its meaning in terms of what character should be called for display or the related CRT. Each controller 50, 52 and 54 stores the information in a respective associated local memory 56, 57, and 60 which is then used for organizing the related CRT display, as well as serving as a refresh memory for the CRT display. Each such controller and memory combination may be of the type commonly used in so-called video terminals.

The controller controls the video circuits 62, 64, and 66 so as to form the images dictated by the stream of ASCII codes coming from the central processor, or CPU 38, unit. This system of converting a stream of ASCII codes into a CRT display is a well-known procedure used in conventional CRT display terminals.

In summary, it may be seen that the overall system is a means for providing a code signal when a push button switch is actuated and for directing that signal toa digital computer where the ASCII code is identified by the software stored in the computer. Subsequently, by suing the software to associate each ASCII character with a particular form of display, the appropriate information is retrieved from a memory, e.g., a disc memory 68, or a drum memory 70 depending upon where the software display control information is stored. Having identified the ASCII code and the action required by it, the program directs the delivery to the input/output bus 42 the required control signals for the particular CRT in which the display is to be shown. Other ASCII codes to the CPU 38 may be used to initiate control actions by the CPU 38 over the input/output bus 42 to process variable controllers 76, 78 and 80 which are located in the field adjacent to the process variables being monitored and/or controlled. Thus, the control signal generated by the CPU 38 is sent to the controller interface 74 to be distributed to the controllers 76, 78 and 80 in accordance with a code associated with the control signal to identify a particular controller to be affected. Conversely, the interface 72 and the input/output bus 42 is used by the CPU 38 on a time-shared basis to receive field data from the process variables being monitored to up-date the information stored by the CPU 38 and video controllers 50, 52 and 54. Thus, the display on a CRT can be modified to present current values of the process variables whereby the operator is presented with a display reflecting actual process operating conditions and the effect of operator induced control actions on the monitored variables.

Accordingly, it may be seen that there has been presented, in accordance with the present invention, a control and display system for providing an operator process interface for display monitored process operating data while allowing manipulation of process variables by the operator.

The embodiments of the invention in which an exclusive property or privilege is claimed are defined as follows:

1. A display system comprising:
a display panel means having at least a first and a second display means having respective display faces for displaying a plurality of corresponding displays on each display face, said displays being interrelated and separately characterized wherein said first display means displays an overview of a plurality of variables, and said second display means displays a detailed display of one of the variables displayed on said first display means,
a plurality of separately actuable means associated with each of said display means, and
control means connected between said display means and said actuable means to control each of said plurality of dislay means in response to an actuated one of said actuable means whereby to select a detailed display for display on said second display means in response to said actuable means associated with said first and said second display means.

2. A display system as set forth in claim 1 wherein said first and said second display means are each a cathode-ray tube.

3. A display system as set forth in claim 1 wherein said display panel means includes a third display means for displaying characterized information on the plurality of variables displayed on said first display means.

4. A display system as set forth in claim 3 wherein said first, second and third display means are each a cathode-ray tube.

5. A display system as set forth in claim 3 wherein said characterized information includes alarm displays for each of said plurality of variables displayed on said first display means.

6. A display system as set forth in claim 1 wherein each of said display faces includes a plurality of contiguous areas forming substantially uninterrupted display for displaying respective ones of said plurality of corresponding displays and said actuable means includes a plurality of manually operable switches with each of said switches being adjacent to a respective one of said plurality of areas in a one-to-one correspondence.

7. A display systems as set forth in claim 1 wherein said control means includes memory means for storing displays to be supplied to said display means and means responsive to the operation of said actuable means for selecting said displays stored in said memory for application to said display means.

8. A display system as set forth in claim 6 wherein said last-mentioned means includes means for receiving input data for supplying output signals representative of said input data and means for applying said output signals to said memory means to alter said displays stored in said memory means.

9. A display system as set forth in claim 7 wherein said means for receiving includes a digital computer.

10. A display system as set forth in claim 9 and including output terminal means and means for applying said output signals to said output terminal means, said output terminal means including process controllers responsive to said output signals for controlling process variables concurrently being displayed on said display means, said output signal being derived from said digital computer, and further actuable means provide signals to said digital computer to effect selective control of said process controllers.

* * * * *

UNITED STATES PATENT OFFICE
CERTIFICATE OF CORRECTION

Patent No. 4,001,807                    Dated January 4, 1977

Inventor(s) Renzo Dallimonti

It is certified that error appears in the above-identified patent and that said Letters Patent are hereby corrected as shown below:

Claims 11, 12, and 13 were omitted from the original patent and are as follows:

11. A display system as set forth in Claim 1 wherein said actuable means associated with said first display means operates said control means to select a detailed display for display on said second display means.

12. A display system as set forth in Claim 1 wherein said actuable means associated with said second display operates said control means to select a detailed display for display on said second display means.

13. A display system as set forth in Claim 11 and wherein said actuable means associated with said second display operates said control means to select a detailed display for display on said second display means.

UNITED STATES PATENT OFFICE
CERTIFICATE OF CORRECTION

Patent No. 4,001,607          Dated  January 4, 1977

Inventor(s)  Kenzo Dallimonti

It is certified that error appears in the above-identified patent and that said Letters Patent are hereby corrected as shown below:

On the cover sheet, after Abstract " 10 Claims"
should read -- 13 Claims --.

*Signed and Sealed this*

Thirty-first *Day of* May 1977

[SEAL]

Attest:

RUTH C. MASON
*Attesting Officer*

C. MARSHALL DANN
*Commissioner of Patents and Trademarks*